Aug. 2, 1966  F. A. GASPARINI  3,263,856
DISPENSING APPARATUS HAVING ICE BREAKING MEANS AND ARTICLE
MAGAZINE SIZE ADJUSTING MEANS
Filed Dec. 4, 1964  5 Sheets-Sheet 1

Aug. 2, 1966   F. A. GASPARINI   3,263,856
DISPENSING APPARATUS HAVING ICE BREAKING MEANS AND ARTICLE
MAGAZINE SIZE ADJUSTING MEANS
Filed Dec. 4, 1964   5 Sheets-Sheet 2

Aug. 2, 1966 F. A. GASPARINI 3,263,856
DISPENSING APPARATUS HAVING ICE BREAKING MEANS AND ARTICLE
MAGAZINE SIZE ADJUSTING MEANS
Filed Dec. 4, 1964 5 Sheets-Sheet 4

Aug. 2, 1966  F. A. GASPARINI  3,263,856
DISPENSING APPARATUS HAVING ICE BREAKING MEANS AND ARTICLE
MAGAZINE SIZE ADJUSTING MEANS
Filed Dec. 4, 1964  5 Sheets-Sheet 5

United States Patent Office 3,263,856
Patented August 2, 1966

3,263,856
DISPENSING APPARATUS HAVING ICE BREAKING MEANS AND ARTICLE MAGAZINE SIZE ADJUSTING MEANS
Francis A. Gasparini, Longmeadow, Mass., assignor to Westinghouse Electric Corporation, East Pittsburgh, Pa., a corporation of Pennsylvania
Filed Dec. 4, 1964, Ser. No. 415,921
4 Claims. (Cl. 221—67)

This invention relates to a bottle dispensing or vending machine, more particularly a machine of the type known as a corded stack machine. A corded stack machine is one having a compartment of a size to hold a plurality of columns of bottles in vertically staggered, horizontally-overlapping relation. The bottles are usually cooled to a temperature below the freezing point of water, often resulting in the bottle to be vended being frozen to an adjacent bottle or part.

It is an object of the present invention to provide a bottle dispensing machine which has improved performance with respect to breaking loose the bottle to be vended from an adjacent bottle or part to which it may be frozen or stuck or moving the bottle if for any other reason it fails to follow the releasing member.

A more particular object is to provide a bottle dispensing machine which has reliable performance of the character set forth with respect to a number of kinds, more particularly different sizes, of bottles.

In an application of Meigs W. Newberry, Serial No. 173,475, filed February 15, 1962, now Patent No. 3,209,-943, issued October 5, 1965, there is disclosed and claimed an ice breaker mechanism for a corded stack bottle dispensing machine. This mechanism includes ice breaker members disposed adjacent, and on the outside of, the positions of the neck of the lowermost bottle when in one column and the neck of the lowermost bottle when in the other column. Upon the dispensing of the lowermost bottle, the ice breaker member adjacent such lowermost bottle moves inwardly, or away from the adjacent side wall, into abutment with the neck of the lowermost bottle to break it loose from an adjacent bottle or part to which it may have become frozen or stuck. Such ice breaker has been found to improve the performance apart from icing or stickiness. Should a bottle fail for any reason to follow the downward motion of the releasing rod or member, the nudging of the neck of the bottle by the ice breaker member assures release of the bottle.

Such ice breaker mechanism has been found to be fully effective when employed with bottles of the size for which the compartment of the vendor is primarily designed. However, bottles of various sizes are in common use in the bottled beverage field, and an operator or user of a vending machine frequently desires to use it with bottles that are smaller than the bottles for which the compartments are primarily designed. Accordingly, spacer plates are mounted on the sides of the compartment adjacent the lower end to provide the proper width for what is known as "cording" of the bottles; in other words, to provide the vertically staggered, horizontally-overlapping relation illustrated on the drawing, to provide the proper operation for dispensing bottles from the compartment. This resulted in some instances, due to the reduction in diameter, in moving the necks of the bottles inwardly from the ice breaker members. Thus, upon a dispensing operation, the movement of the ice breaker member was taken up in moving to the neck of the bottle, so that little or no movement of the neck of the bottle resulted.

In accordance with the present invention, the spacer plates are of a form that includes a cut-out area that does not contact the shoulders of the bottles in the space within which the bottles are confined thus enabling the shoulders of the bottles to move into contact with the partition walls behind the spacers and the bottle necks to be positioned closer to the compartment walls. For example, in the illustrated embodiment, this is accomplished simply by cutting out a corner portion of the spacer plate that includes this region. Thus, the neck of the lowermost bottle has ample freedom to move outwardly until it engages the adjacent ice breaker member. Thus, upon movement of the ice breaker member during a dispensing operation, its full movement is imparted to the neck of the bottle and it is, therefore, effective to break it loose from any ice formation that may have developed.

These and other objects are effected by the invention as will be apparent from the following description and claims taken in conjunction with the accompanying drawings, forming a part of this application, in which:

Figure 1:
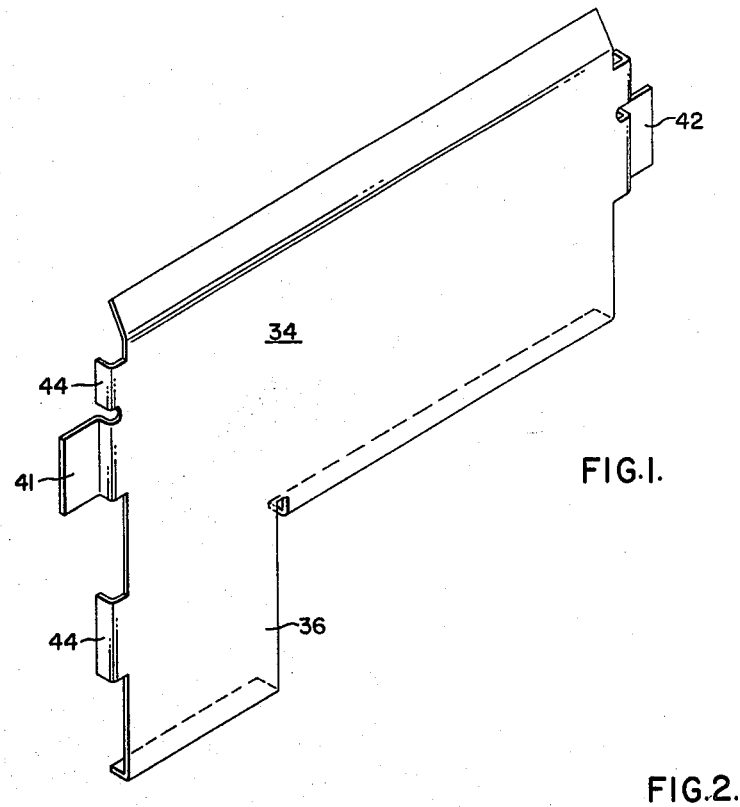
FIG. 1 is a perspective view of a left-hand spacer plate in accordance with the present invention.

Referring to the drawings in detail, there is shown a wall structure providing one compartment 10 of a bottle dispensing or vending machine which may comprise any desired number of such compartments. The wall structure comprises side walls 11 and 12 and front wall portions 13. At the rear, there is a channel member 14 having forwardly-projecting flanges 15 and 16 for retaining the necks of the bottles against outward movement toward the side walls. The channel member may be mounted by means of brackets 21 engaging the side walls 11 and 12.

Figure 3:
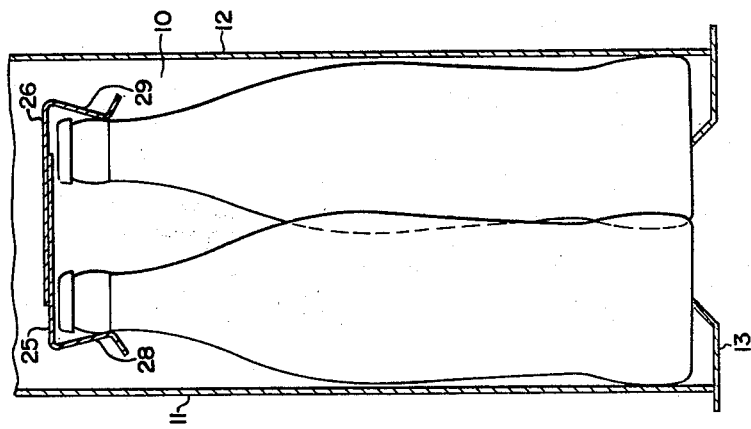
FIG. 3 is a horizontal section, taken on the line III—III of FIG. 6, showing the compartment containing bottles of the largest size for which it is designed.

The side walls 11 and 12 are spaced apart a distance adapting the compartment to hold a stack of bottles of a desired diameter in corded or vertically staggered, horizontally-overlapping relation as shown on the drawing. In this arrangement, the butt or lower end of each bottle contacts the adjacent side wall, any bottle immediately above or below the same in the same column and any immediately higher or lower bottle in the other column. The flanges 15 and 16 of the channel member or neck guide 14 are spaced from each other a distance such as to retain the bottles within a limited dimension such that the shoulders of the bottles are spaced slightly from the side walls as shown in FIG. 3. This arrangement avoids friction between the bottle and the side wall at the shoulder and provides free and more reliable movement of the bottles.

Figure 6:
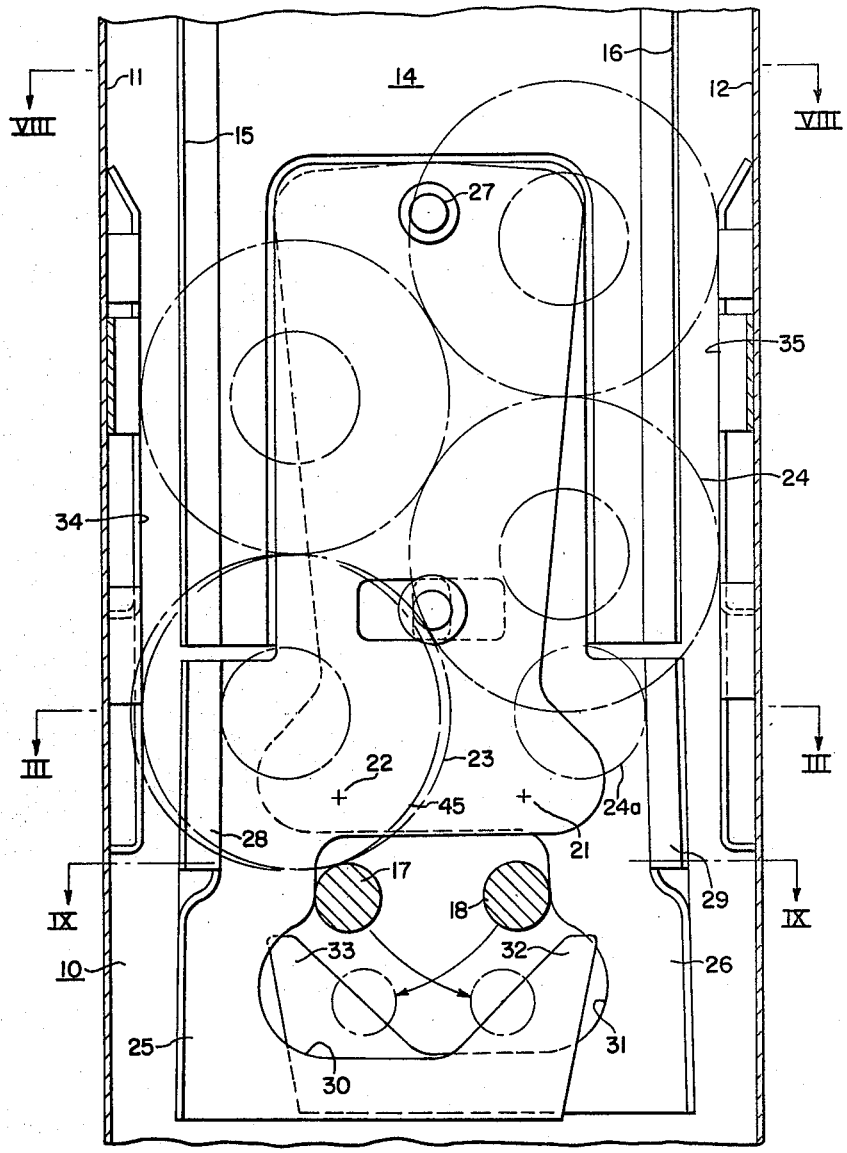
FIG. 6 is a vertical section through the compartment, showing the ice breaker mechanism and spacer plates in front elevation.
Figure 7:
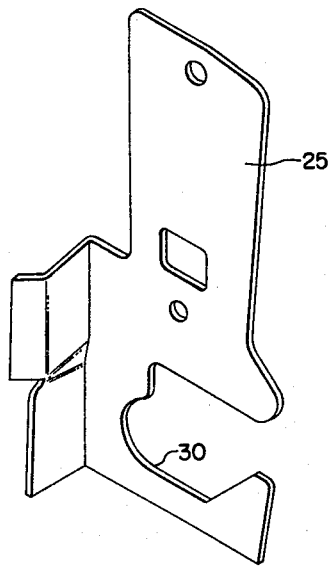
FIG. 7 is a perspective view of one of the bottle engaging or ice breaker members.

Any suitable bottle supporting and releasing mechanism is provided at the lower end of the compartment. The illustrated mechanism is the same in construction and operation for use with smaller diameter bottles as shown in FIG. 6 and with the larger diameter bottles shown in FIG. 10. It comprises two rods 17 and 18 mounted on levers 19 and 20, which are pivoted on centers 21 and 22 respectively. The lowermost bottle in the compartment rests on one of the two rods 17 and 18. In FIG. 6 the lowermost bottle 23 is in the left-hand column and rests on the rod 17. The second lowermost bottle 24 is in the right-hand column and rests on the bottle 23.

Figure 10:
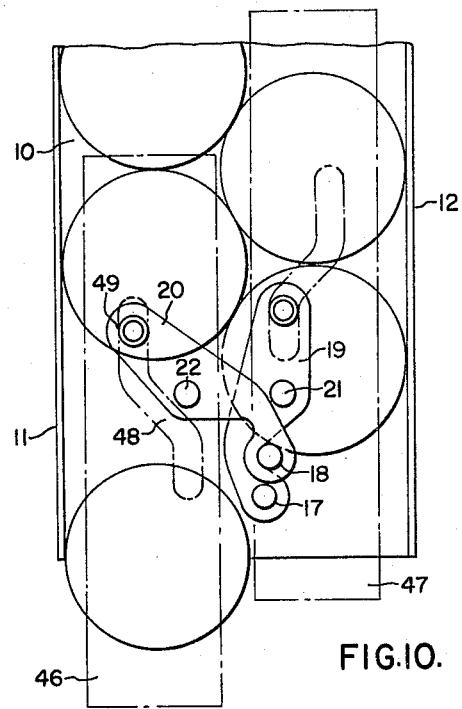
FIG. 10 is a front elevational view showing the bottle releasing mechanism.
Figure 8:
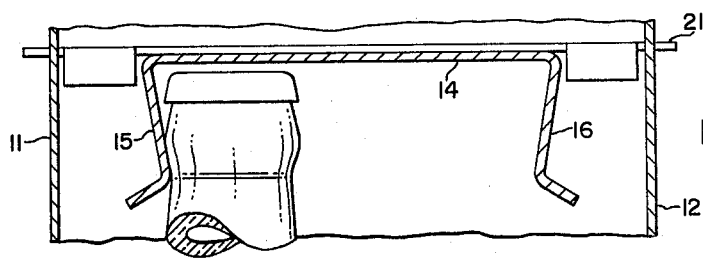
FIG. 8 is a fragmentary horizontal section taken on the line VIII—VIII of FIG. 6.

To release the lowermost bottle 23, the rod 17 is moved downwardly and to the right about the pivot center 21, permitting the bottle 23 to move downwardly, while the rod 18 remains stationary. The bottle 24 and all the bottles above it move downwardly along with the bottle 23 until the bottle 24 engages the rod 18, after which the bottle 24 rests on the rod 18 and supports all the bottles above it. Continued movement of the rod 17 permits the bottle 23 to leave the bottle 24, and to drop between the side wall 11 and the two rods 17 and 18, as illustrated in FIG. 10. The rod 17 is returned to its rest or bottle supporting position shown in FIG. 6. The bottle 24 is now the lowermost bottle in the compartment.

Figure 9:
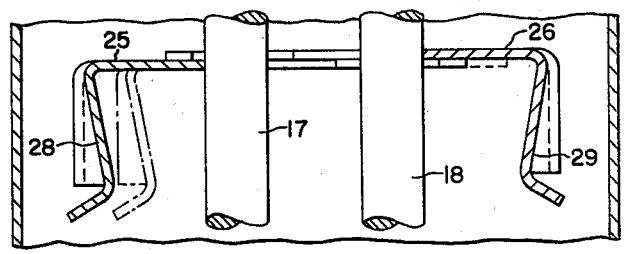
FIG. 9 is a horizontal section taken on the line IX—IX of FIG. 6.

An ice breaker mechanism of the type disclosed and claimed in application Serial No. 173,475, now Patent No. 3,209,943, of Meigs W. Newberry is provided. In describing the ice breaker mechanism, reference is again made to FIG. 6, which shows the spacer plates to accommodate the smaller bottles, but the mechanism will first be described in general terms, and differences applying to different sizes of bottles will be discussed later. Referring to FIGS. 6 and 9, the mechanism is mounted on the channel member or neck guide 14 and in effect constitutes a continuation of the neck guide. It comprises two abutment or ice breaker members 25 and 26, which are pivoted to the channel 14 by a pivot pin 27. The ice breaker members 25 and 26 are provided with flanges 28 and 29, which, when the ice breaker members are in their normal positions, are in substantial alignment with, and in effect constitute continuations of, the flanges 15 and 16 respectively.

As shown in FIGS. 6 and 9, the flange 28 is disposed adjacent and on the outside of the neck of the lowermost bottle 23, which is the lowermost bottle in the compartment and is in the left-hand column. The flange 29 is disposed adjacent and on the outside of the neck, indicated by the circle 24a, of the bottle 24 when it rests on the rod 18 and is the lowermost bottle in the compartment after the bottle 23 has been released. In other words, the flanges 28 and 29 are disposed adjacent and on the outside of the position of the neck of the lowermost bottle when in one column and the position of the neck of the lowermost bottle when in the other column.

The ice breaker members 25 and 26 are formed with suitable recesses 30 and 31 respectively to accommodate the rods 17 and 18. The member 25 is formed with a projection 32 disposed in the path of movement of the rod 17 as it approaches its final releasing position. Thus, as the rod 17 is about to release the bottle 23, it strikes the projection 32 to move the abutment member 25 to the right, or counterclockwise about the pivot 27, whereupon the flange 28 engages the neck of the bottle 23 to move it to the right, thereby to break it loose from an adjacent bottle and a part of any wall or stationary structure, if it has been frozen or stuck to any of them or if, for any reason the bottle fails to follow the rod 17. Likewise, as the rod 18 swings downwardly and to the left to release the bottle 24, it strikes the projection 33 of the member 26, moving it and its flange 29 to the left, or clockwise above the pivot 27, the flange 29 moving the neck of the bottle 24 to the left should it have become frozen in place or for any other reason have failed to follow the rod 18. The lowermost bottle is the one subject to the greatest possibility of being frozen in place, due to the fact that the chilled air for cooling the bottles is usually caused to flow upwardly through the compartment, striking the lowermost bottle first.

The ice breaker mechanism described has been found to be completely reliable when using bottles of the size providing a corded stack of the width for which the compartment 10 is designed; for example, when using 12 ounce bottles of 2⅝" diameter in a compartment having a width equal to or slightly greater than the width of a corded stack of such bottles. In such case, the flanges of the channel member or neck guide hold the necks of the bottles so that the shoulders of the bottles are sufficiently spaced from the side walls, as shown in FIG. 3, to assure that, notwithstanding manufacturing variations, the neck of the bottle will always engage the ice breaker flange before the shoulder engages the side wall. Thus, the entire movement of the ice breaker flange is effective in moving the neck of the bottle to break it loose in the event that it has become frozen or stuck to another bottle or part.

Figure 4:
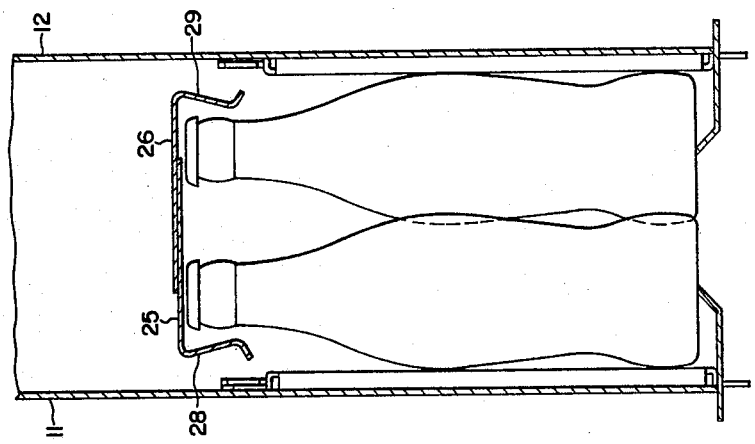
FIG. 4 is a similar view showing the compartment with spacer plates of the type heretofore used to adapt the compartment to bottles of smaller size.

Frequently the owner or operator of a bottle vending machine desires to use it to vend bottles of a smaller size; for example, bottles of either 6½ or 10 ounce capacity, having a diameter of 2⅜" at the butt end and at the shoulder. To adapt the same vending machine for such use with a minimum of change and expense, the channel member is moved forwardly to accomodate the shorter length of bottle, as may be seen by comparison of FIGS. 3 and 4, the spacer plates are provided on the side walls adjacent the two or three lowermost bottles to restrict the width of the compartment in this region to the width of a corded stack of the smaller diameter bottles. The spacer plates have sufficient horizontal extent to contact the bottles at the butt ends and at the shoulders, as shown in FIG. 4. It was found, however, when using smaller bottles in the machine with such spacer plates of the type heretofore used, that the ice breaker mechanism is not always fully effective. The spacer plate in contacting the shoulder of the lowermost bottle limits the movement of the neck of the bottle toward the side wall, sometimes to such an extent that it is spaced from the ice breaker flange a distance substantially equal to the movement of the ice breaker flange. Accordingly, the movement of the ice breaker flange is taken up in moving to the neck of the bottle and does not effect movement thereof to break the bottle loose, as will be readily apparent from FIG. 4, which shows such a condition, possibly an extreme or an exaggerated condition thereof.

In accordance with the present invention, there are provided spacer plates that provide proper spacing between the surfaces between which the bottles are confined at the butt end of the lowermost bottle and preferably also at the butt end and the shoulder of the second lowermost bottle, but which spacer plates are cut away at the portion which would normally contact the shoulder of the lowermost bottle, so as to permit the shoulder of the lowermost bottle to move towards and contact the compartment side wall and its neck end to be moved laterally into engagement with the ice breaker flange. In the illustrated embodiment, this is effected simply by cutting out the portion of the spacer plates adjacent the shoulder of the lowermost bottle.

Figure 2:
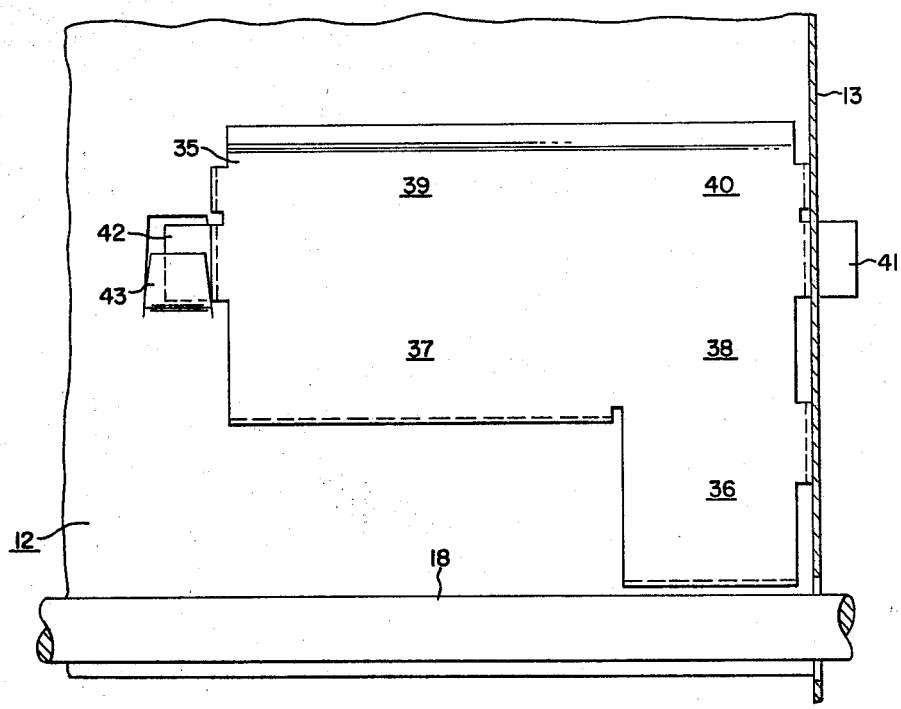
FIG. 2 is an elevation of a right-hand spacer plate.

Two such spacer plates, comprising a left-hand spacer plate 34 and a right-hand spacer plate 35, are shown in FIGS. 1 and 2, respectively. A rectangular portion at the rear lower corner is cut out of each plate, leaving the lower portion 36 at the lower front corner adapted to be engaged by the butt end of the lowermost bottle and areas 37 and 38 adapted to be engaged by the shoulder and the butt end, respectively, of the second lowermost bottle. The spacer plates may be of sufficient height, as in the illustrated embodiment, to include areas 39 and 40 to contact respectively the shoulder and the butt end of the third lowermost bottle.

The spacer plates may be mounted in any suitable manner; for example, each plate may have a tongue 41 at the front end extending through a slot in the front wall portion 13, and a tongue 42 at the rear end retained by a struck out tab 43 of the side wall 12. The plates may be provided with suitable flanges 44 bent at right angles thereto and extending into abutment with the side walls to provide the desired spacing of the bottle contacting surfaces relative to the side walls. It is to be understood that any suitable expedient may be employed to adjust the spacing; for example, there may be employed the very common expedient of inserting spacer shims between the spacer plates and the side walls.

Figure 5:
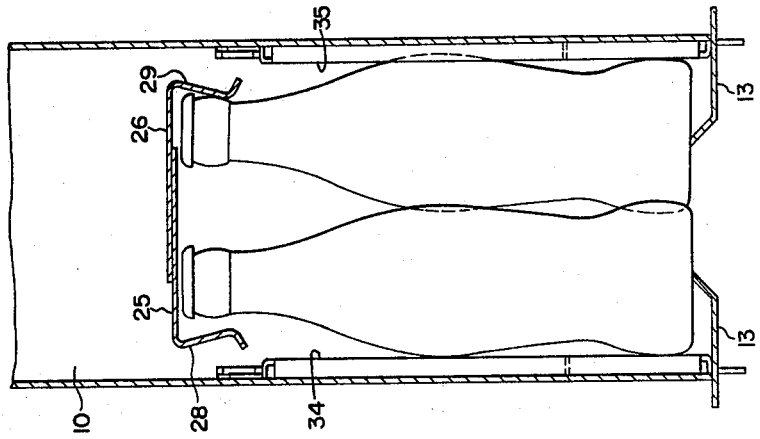
FIG. 5 is a similar view of the compartment with spacer plates in accordance with the present invention to adapt it to bottles of smaller size.

Considering the operation of the ice breaker in connection with the smaller bottles of 2⅜" diameter, the surfaces 36 to 40 inclusive provide a restricted space within which the bottles are confined at the butt end of the lowermost bottle and the shoulder and butt end of the second and third lowermost bottles to provide the desired corded relation as shown in FIG. 6, wherein the circle designated by the reference numeral 23 represents the butt end of the lowermost bottle. The shoulder of the lowermost bottle, however, as previously mentioned, is not restricted by the spacer plate, but is free to move toward the side wall, as represented by the circle 45 in FIG. 6 and as illustrated by the bottle on the right-hand side in FIG. 5. Thus, the lowermost bottle moves toward the adjacent side wall until its neck abuts the ice breaker flange 28 as shown in FIG. 6, or the flange 29 as shown in FIG. 5. Thus, movement of the ice breaker flange inwardly or away from the side wall during the dispensing operation effects movement of the bottle to break it loose from an adjacent bottle or a part in the event that it should have become frozen or stuck to either, or have failed to move for any other reason.

Figure 11:
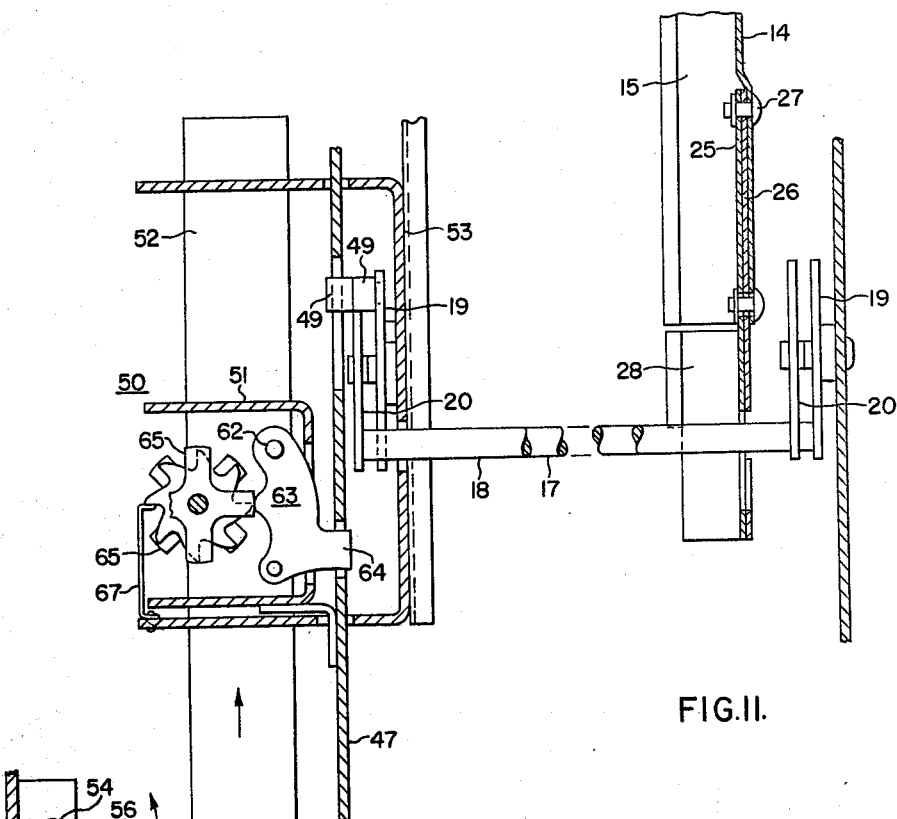
FIG. 11 is a vertical sectional view, taken longitudinally of the compartment, showing the bottle releasing mechanism.
Figure 12:
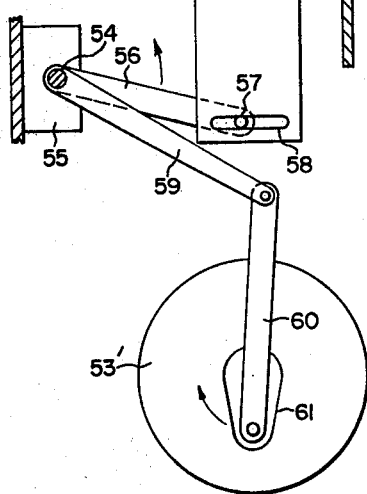
FIG. 12 is an elevation of a detail of the bottle releasing mechanism.
Figure 12:
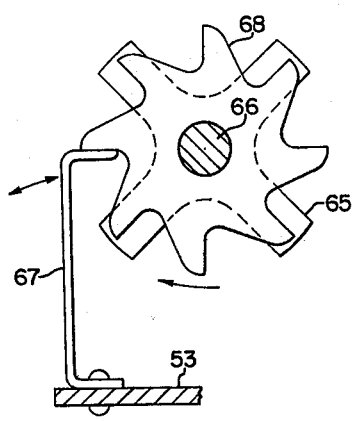

Any suitable mechanism may be provided for operating the rod 17 and 18 in alternating sequence, each rod being moved downwardly to releasing position and returned to its normal or rest position, while the other rod remains in its normal or rest position. One embodiment of such an operating mechanism is shown in FIGS. 10, 11 and 12. This mechanism includes vertically slidable cam plates 46 and 47 formed with cam slots 48 that receive cam followers 49 mounted on the upper ends of the levers 19 and 20. Each cam slot 48 is formed, as shown in FIG. 10, so that upon upward movement of the cam plate from its lowermost to its uppermost position, the associated rod 17 or 18 is moved from bottle supporting position to bottle releasing position and, upon return downward movement of the plate, the rod is returned to its bottle supporting position.

The cam plates 46 and 47 may be operated by a vertically movable structure 50, shown in FIG. 11, which includes a horizontally extending channel member 51 fixedly attached to vertical plates 52 which extend, and are vertically movable, through slots in the horizontal flanges of a stationary channel member 53. The structure 50 may be raised and lowered by a motor and speed reducer unit 53′ through mechanism which includes a horizontal oscillating or rock shaft 54 journaled in stationary structure 55 and having fixed thereon levers 56 provided with pins 57 at their outer ends that extend through horizontal slots 58 in the lower ends of the plates 52. A lever 59 is fixed at one end to the shaft 54 and at its other end is pivoted to a connecting rod 60, the other end of which is pivoted to a crank 61 of the motor and speed reducer unit 53′.

The crank 61 makes one revolution for each dispensing or vending operation of the machine, starting from its lowermost position. During the first half of its revolution, the crank 61 moves upwardly and, through the connecting rod 60, the lever 59, the shaft 54, the levers 56 and the pins 57, moves the structure 50 upwardly and during the second half of its revolution it similarly moves such structure downwardly.

There is pivotally mounted on the structure 50 at 62, for each cam plate, a lifter 63 having a finger 64 adapted to enter a slot in the cam plate when the lifter is moved to the right by the lobe of a cam 65. The lobes of the two cams 65 are arranged in alternating relation so that alternately one and then the other of the cam plates 46 and 47 are operated upon the successive vending operations. The shaft 66 on which the cams 65 are fixed is advanced at the end of each operation to bring a cam lobe into engagement with the other lifter by means of a spring finger 67 mounted on the stationary channel member 53 and adapted to engage a tooth of a ratchet wheel 68 fixed on the shaft 66. Upon upward movement of the structure 50, the spring finger 67 is bent or sprung to the left by the camming or inclined upper surface of the adjacent tooth of the ratchet wheel and upon downward movement, the spring finger 67 engages the lower surface of the tooth of the ratchet wheel 68 to effect the desired angular movement of the shaft 66. Thus, upon successive vending operations of the vending mechanism, the rods 17 and 18 are alternately operated to dispense bottles alternately from the two columns.

I claim as my invention:
1. In a bottle dispensing machine, the combination of
  a magazine structure providing a compartment adapted to contain two columns of bottles in corded or vertically staggered, horizontally-overlapping relation,
  bottle supporting and releasing mechanism at the bottom of the compartment,
  means for operating said mechanism to release the lowermost bottle and to retain the second lowermost bottle,
  a first ice breaker member disposed on the outer side of the neck of the lowermost bottle when it is in the first column and a second ice breaker member disposed on the outer side of the lowermost bottle in the second column when the lowermost bottle is in the second column,
  means operative during a dispensing operation to move that ice breaker member which is adjacent the lowermost bottle being dispensed, and
  spacer plates at the sides of the compartment adjacent the lower end thereof, said spacer plates having a cut-out portion in the area against which the bottles are confined at the shoulder of the lowermost bottle so as to permit the neck end of the lowermost bottle to move outwardly towards its adjacent ice breaker member.
2. In a bottle dispensing machine,
  a magazine structure comprising side and end wall portions providing a compartment adapted to hold two columns of bottles in corded or vertically staggered, horizontally-overlapping relation,
  bottle supporting and releasing means at the lower end of the compartment for alternately releasing a bottle from the lower end of one and then the other of the columns,
  movable ice breaker members disposed respectively adjacent the neck end of the lowermost bottle when in one column and the neck end of the lowermost bottle when in the other column, and each adapted to move the lowermost bottle when in the adjacent column away from the adjacent side wall to break it away from an adjacent bottle or part to which it may have become frozen or stuck,
  means for concomitantly actuating said releasing mechanism and one ice breaker member, and
  spacer plates mounted on the sides in the lower portion of the compartment to adapt the compartment for smaller bottles, each of said spacer plates being of a form to space the butt end of the lowermost bottle and the shoulder and the butt end of the sec- ond lowermost bottle a distance from the adjacent side wall and having a cut-out portion in the vicinity of the shoulder of the lowermost bottle so that the shoulder of the lowermost bottle can move towards the adjacent side wall to move the bottle neck towards the adjacent ice breaker member.

3. In bottle dispensing apparatus, the combination of a magazine structure comprising side walls and end wall portions providing a compartment adapted to hold two columns of bottles in corded or vertically staggered, horizontally overlapping relation, bottle supporting and releasing means at the lower end of the compartment operable to alternately release a bottle from the lower end of one and then the other of the columns, ice breaker members disposed on the outer sides of the positions occupied by the neck of the lowermost bottle when in one column and the neck of the lowermost bottle when in the other column, means for operating said bottle supporting and releasing mechanism to dispense the lowermost bottle and, during such operation, operating the ice breaker member adjacent the column from which a bottle is being released, and spacer plates mounted adjacent the lower portions of said side walls, said spacer plates comprising surfaces adapted to be engaged by the butt ends of the two lowermost bottles and surfaces adapted to be engaged by the shoulder of the second lowermost bottle and also having cut-out portions in the vicinity of the shoulder surfaces of the two lowermost bottles to permit the shoulder of the lowermost bottle to move closer to the adjacent side wall and to assure engagement of the neck of the lowermost bottle with the adjacent ice breaker member.

4. In bottle dispensing apparatus, the combination of a magazine structure comprising side walls and end wall portions providing a compartment adapted to hold two columns of bottles in corded or vertically staggered, horizontally overlapping relation, bottle supporting and releasing means at the lower end of the compartment operable to alternately release a bottle from the lower end of one and then the other of the columns, ice breaker members disposed on the outer sides of the positions occupied by the neck of the lowermost bottle when in one column and the neck of the lowermost bottle when in the other column, means for operating said bottle supporting and releasing mechanism to dispense the lowermost bottle and, during such operation, operating the ice breaker member adjacent the column from which a bottle is being released, and spacer plates mounted adjacent the lower portions of said side walls, said spacer plates comprising surfaces adapted to be engaged by the butt ends of the two lowermost bottles and surfaces adapted to be engaged by the shoulder of the second lowermost bottle and having a cut-out portion in the area of the shoulder of the lowermost bottle, whereby the latter is free to move sufficiently close to the adjacent side wall to assure engagement of the neck of said lowermost bottle with the adjacent ice breaker member.

References Cited by the Examiner

UNITED STATES PATENTS

| | | | |
|---|---|---|---|
| Re. 25,321 | 1/1963 | Torres | 221—67 |
| 3,104,779 | 9/1963 | Denzer | 221—200 |
| 3,209,942 | 10/1965 | Gasparini et al. | 221—116 |
| 3,209,943 | 10/1965 | Newberry | 221—67 |

RAPHAEL M. LUPO, *Primary Examiner.*

W. SOBIN, *Assistant Examiner.*